United States Patent
Myntti

(10) Patent No.: US 10,653,133 B2
(45) Date of Patent: May 19, 2020

(54) ANTIMICROBIAL SOLID AND METHODS OF MAKING AND USING SAME

(75) Inventor: Matthew F. Myntti, St. Augustine, FL (US)

(73) Assignee: Next Science IP Holdings Pty Ltd, Chatswood, NSW (AU)

( * ) Notice: Subject to any disclaimer, the term of this patent is extended or adjusted under 35 U.S.C. 154(b) by 1197 days.

(21) Appl. No.: 13/468,767

(22) Filed: May 10, 2012

(65) Prior Publication Data

US 2012/0288469 A1     Nov. 15, 2012

Related U.S. Application Data

(60) Provisional application No. 61/484,558, filed on May 10, 2011.

(51) Int. Cl.
*A01N 43/36*     (2006.01)
*A01N 25/10*     (2006.01)
*A01N 25/08*     (2006.01)

(52) U.S. Cl.
CPC ............ *A01N 25/10* (2013.01); *A01N 25/08* (2013.01)

(58) Field of Classification Search
None
See application file for complete search history.

(56) References Cited

U.S. PATENT DOCUMENTS

| | | | |
|---|---|---|---|
| 3,422,186 A | 1/1969 | Sasmor |
| 4,002,775 A | 1/1977 | Kabara |
| 4,067,997 A | 1/1978 | Kabara |
| 4,107,328 A | 8/1978 | Michaels |
| 4,323,551 A | 4/1982 | Parran, Jr. |
| 4,851,521 A | 7/1989 | della Valle et al. |
| 5,017,229 A | 5/1991 | Burns et al. |
| 5,145,664 A | 9/1992 | Thompson |
| 5,166,331 A | 11/1992 | della Valle et al. |
| 5,208,257 A | 5/1993 | Kabara |
| 5,229,103 A | 7/1993 | Eagle et al. |
| 5,246,964 A | 9/1993 | Ueno |
| 5,290,552 A | 3/1994 | Sierra et al. |
| 5,326,567 A | 7/1994 | Capelli |
| 5,348,678 A | 9/1994 | Hodam, Jr. et al. |
| 5,442,053 A | 8/1995 | della Valle et al. |
| 5,480,658 A | 1/1996 | Melman |
| 5,543,383 A | 8/1996 | Parker |
| 5,575,815 A | 11/1996 | Slepian et al. |
| 5,631,241 A | 5/1997 | della Valle et al. |
| 5,644,049 A | 7/1997 | Giusti et al. |
| 5,662,913 A | 9/1997 | Capelli |
| 5,676,964 A | 10/1997 | della Valle et al. |
| 5,709,546 A | 1/1998 | Waggoner |
| 5,763,410 A | 7/1998 | Edwardson et al. |
| 5,895,781 A | 4/1999 | Neumiller et al. |
| 5,910,420 A | 6/1999 | Tuompo et al. |
| 5,925,334 A | 7/1999 | Rubin et al. |
| 6,001,870 A | 12/1999 | Henkel |
| 6,013,657 A | 1/2000 | Lavon et al. |
| 6,063,061 A | 5/2000 | Wallace et al. |
| 6,143,330 A | 11/2000 | Aaltonen et al. |
| 6,149,822 A | 11/2000 | Fabri et al. |
| 6,156,294 A | 12/2000 | Mautone |
| 6,156,792 A | 12/2000 | Hatton et al. |
| 6,203,822 B1 | 3/2001 | Schlesinger et al. |
| 6,224,857 B1 | 5/2001 | Romeo et al. |
| 6,248,371 B1 | 6/2001 | Domenico |
| 6,284,804 B1 | 9/2001 | Singh et al. |
| 6,342,251 B1 | 1/2002 | Illum et al. |
| 6,375,963 B1 | 4/2002 | Repka et al. |
| 6,395,295 B1 | 5/2002 | Hills et al. |
| 6,395,746 B1 | 5/2002 | Cagle et al. |
| 6,423,694 B1 | 7/2002 | Drutz et al. |
| 6,521,431 B1 * | 2/2003 | Kiser et al. ............... 435/177 |
| 6,533,749 B1 | 3/2003 | Mitusina et al. |
| 6,541,460 B2 | 4/2003 | Petito |
| 6,610,314 B2 | 8/2003 | Koenig et al. |
| 6,616,913 B1 | 9/2003 | Mautone |
| 6,623,513 B2 | 9/2003 | Biel |
| 6,676,930 B2 | 1/2004 | Mautone |
| 6,685,697 B1 | 2/2004 | Arenberg et al. |
| 6,686,346 B2 | 2/2004 | Nilsson et al. |
| 6,701,940 B2 | 3/2004 | Tsibouklis et al. |
| 6,706,290 B1 | 3/2004 | Kajander et al. |
| 6,723,709 B1 | 4/2004 | Pressato et al. |

(Continued)

FOREIGN PATENT DOCUMENTS

| | | |
|---|---|---|
| EP | 1374856 A1 | 1/2004 |
| WO | 1994005330 A1 | 8/1993 |
| WO | 2003061579 A2 | 7/2003 |

OTHER PUBLICATIONS

Author: Betsy C. Herold et al.; Title: Poly(Sodium 4-Styrene Sulfonate): An Effective Candidate Topical Antimicrobial for the Prevention of Sexually Transmitted Diseases; J Infect Dis. (2000) 181 (2): 770-773. Presented in part at annual meeting of the Society for Pediatric Research, San Francisco, May 1999.*

J.O. Anglen et al., "The Efficacy of Various Irrigation Solutions in Removing Slime-Producing *Staphylococcus*," J. Orthop. Trauma, 1994, vol. 8, No. 5, pp. 390-396, (Raven Press, Ltd.; New York, NY).

Z. Bendouah et al., "Biofilm formation by *Staphylococcus aureus* and *Pseudomonas aeruginosa* . . . ," Otolaryngology—Head and Neck Surgery, 2006, vol. 134, No. 6, pp. 991-996, (Amer. Acad. of Otolarngology—Head and Neck Surgery Foundation; Alexandria, Virginia).

(Continued)

*Primary Examiner* — Yanzhi Zhang
(74) *Attorney, Agent, or Firm* — Zollinger & Burleson Ltd.

(57) ABSTRACT

A solid material adapted to kill bacteria in planktonic, spore and biofilm states is lethal toward a wide spectrum of gram positive and gram negative bacteria as well as other microbes. The solid material includes a significant amount of one or more surfactants entrained in a crosslinked polymeric network.

15 Claims, No Drawings

(56) References Cited

U.S. PATENT DOCUMENTS

| | | |
|---|---|---|
| 6,762,160 B2 | 7/2004 | Barbeau et al. |
| 6,812,196 B2 | 11/2004 | Rees et al. |
| 6,855,678 B2 | 2/2005 | Whiteley |
| 6,867,233 B2 | 3/2005 | Roselle et al. |
| 6,869,938 B1 | 3/2005 | Schwartz et al. |
| 6,872,241 B2 * | 3/2005 | Soane ............... B01D 46/0001 422/120 |
| 6,891,037 B1 | 5/2005 | Hasler et al. |
| 6,919,348 B2 | 7/2005 | Wei |
| 6,936,579 B2 | 8/2005 | Urban |
| 6,953,772 B2 | 10/2005 | Lopes |
| 6,962,813 B2 | 11/2005 | Pier et al. |
| 6,989,195 B2 | 1/2006 | Anderson |
| 7,090,882 B2 | 8/2006 | Koefod et al. |
| 7,119,217 B2 | 10/2006 | Jiang et al. |
| 7,128,897 B2 | 10/2006 | Osbakken et al. |
| 7,220,431 B2 | 5/2007 | Sawchuk et al. |
| 7,238,363 B2 | 7/2007 | Monsouri et al. |
| 7,244,841 B2 | 7/2007 | Love et al. |
| 7,341,983 B2 | 3/2008 | Pedersen et al. |
| 7,410,480 B2 | 8/2008 | Muni et al. |
| 7,446,089 B2 | 11/2008 | Singh et al. |
| 7,494,963 B2 | 2/2009 | Ahmed et al. |
| 7,544,192 B2 | 6/2009 | Eaton et al. |
| 7,691,829 B2 | 4/2010 | Petito et al. |
| 7,714,011 B2 | 5/2010 | Clarot et al. |
| 7,803,150 B2 | 9/2010 | Chang et al. |
| 7,848,487 B2 | 12/2010 | Miekka et al. |
| 7,959,943 B2 | 6/2011 | Hissong et al. |
| 7,976,873 B2 | 7/2011 | Myntti et al. |
| 7,993,675 B2 | 8/2011 | Oliver et al. |
| 2001/0051613 A1 | 12/2001 | Illum et al. |
| 2003/0079758 A1 | 5/2003 | Siegel et al. |
| 2003/0133883 A1 | 7/2003 | Finnegan et al. |
| 2003/0139382 A1 | 7/2003 | Wall et al. |
| 2003/0220039 A1 * | 11/2003 | Chen et al. ................... 442/327 |
| 2004/0101506 A1 | 5/2004 | Fust |
| 2004/0214753 A1 | 10/2004 | Britten et al. |
| 2005/0003007 A1 | 1/2005 | Boix et al. |
| 2005/0042240 A1 | 2/2005 | Utterberg et al. |
| 2005/0064508 A1 | 3/2005 | Belcher et al. |
| 2005/0080396 A1 | 4/2005 | Rontal |
| 2005/0106728 A1 | 5/2005 | Burgess et al. |
| 2005/0191430 A1 * | 9/2005 | Rubner et al. ............. 427/407.1 |
| 2005/0220895 A1 | 10/2005 | Bucalo et al. |
| 2005/0226937 A1 | 10/2005 | O'Hagan et al. |
| 2005/0282722 A1 | 12/2005 | McReynolds et al. |
| 2006/0003008 A1 | 1/2006 | Gibson et al. |
| 2006/0018945 A1 | 1/2006 | Britigan et al. |
| 2006/0045850 A1 | 3/2006 | Namburi et al. |
| 2006/0051385 A1 | 3/2006 | Scholz |
| 2007/0207192 A1 | 9/2007 | Holl et al. |
| 2007/0264296 A1 | 11/2007 | Myntti |
| 2008/0176306 A1 | 7/2008 | MacPhee et al. |
| 2008/0248558 A1 | 10/2008 | Deinhammer et al. |
| 2009/0005339 A1 | 1/2009 | Scholz et al. |
| 2009/0011097 A1 | 1/2009 | Koefod et al. |
| 2010/0016267 A1 | 1/2010 | Theeuwes et al. |
| 2010/0086576 A1 * | 4/2010 | Myntti ......................... 424/405 |
| 2010/0240770 A1 | 9/2010 | Qi et al. |
| 2011/0245757 A1 | 10/2011 | Myntti et al. |

OTHER PUBLICATIONS

M.S. Benninger et al., "Adult chronic rhinosinusitis: Definitions, diagnosis, epidemiology, and pathophysiology," Supplement to Otolaryngology—Head and Neck Surgery, 2003, vol. 129, No. 3, pp. S1-S32 (American Academy of Otolaryngology—Head and Neck Surgery Foundation; Alexandria, Virginia).

N. Bhattacharyya, "Clinical outcomes after endoscopic sinus surgery," Current Opinion in Allergy & Clinical Immunology, 2006, 6(3), pp. 161-171 (Lippincott Williams & Wilkins, Inc.; Philadelphia, Pennsylvania)—abstract only.

N. Bhattacharyya et al., "The Microbiology of Recurrent Rhinosinusitis After Endoscopic Sinus Surgery," Arch. Otolaryngol.—Head and Neck Surg., 1999, vol. 125, pp. 1117-1120 (American Medical Assn.; Chicago, Illinois).

A.G. Chiu et al., "Surgical Management of Chronic Rhinosinusitis and Nasal Polyposis: A Review of the Evidence," Current Allergy and Asthma Reports, 2004, vol. 4, pp. 486-489 (Current Science Inc.; Philadelphia, Pennsylvania).

R.A. Chole et al., "Evidence for Microbial Biofilms in Cholesteatomas," Arch. Otolaryngol.—Head and Neck Surg., 2002, vol. 128, pp. 1129-1133 (American Medical Assn.; Chicago, Illinois).

J.W. Costerton et al., "Bacterial Biofilms: A Common Cause of Persistent Infections," Science, 1999, vol. 284, pp. 1318-1322 (Am. Assn. for the Advancement of Science; Washington, D.C.).

J. Cryer et al., "Evidence of Bacterial Biofilms in Human Chronic Sinusitis," ORL, 2004, vol. 66, pp. 155-158 (S. Karger AG; Basel, Switzerland).

M. Desrosiers, "Refractory Chronic Rhinosinusitis Pathophysiology and Management of Chronic Rhinosinusitis Persisting After Endoscopic Sinus Surgery," Current Allergy and Asthma Reports, 2004, vol. 4, pp. 200-207 (Current Science Inc.; Philadelphia, Pennsylvania).

J.R. Dingman et al., "Correlation between Presence of Viable Bacteria and Presence of Endotoxin in Middle-Ear Effusions," J. Clin. Microbiol., 1998, vol. 36, No. 11, 3417-19 (Am. Soc. for Microbiology; Washington, D.C.).

R.M. Donlan, "Biofilms: Microbial Life on Surfaces," Emerging Infectious Diseases, 2002, vol. 8, No. 9, pp. 881-890 (Center for Disease Control; Atlanta, Georgia).

G.D. Ehrlich et al., "Mucosal Biofilm Formation on Middle-Ear Mucosa in the Chinchilla Model of Otitis Media," JAMA, 2002, vol. 287, No. 13, 1710-15 (American Medical Assn.; Chicago, Illinois).

N. Fergie et al., "Is otitis media with effusion a biofilm infection?", Clin. Otolaryngology, 2004, vol. 29, pp. 38-46 (Blackwell Publishing Ltd.; Oxford, UK).

B.J. Ferguson et al., "Demonstration of Biofilm in Human Bacterial Chronic Rhinosinusitis," Am. J. Rhinology, 2005, vol. 19, No. 5, pp. 452-457, (OceanSide Publications, Inc.; Providence, Rhode Island).

F. Götz, "*Staphylococcus* and biofilms," Molecular Microbiology, 2002, vol. 43(6), pp. 1367-1378 (Blackwell Science Ltd.; Oxford, UK).

L. Hall-Stoodley et al., "Direct Detection of Bacterial Biofilms on the Middle-Ear Mucosa of Children With Chronic Otitis Media," JAMA, 2006, vol. 296, No. 2, pp. 202-211 (American Medical Assn.; Chicago, Illinois).

K.K. Jefferson et al., "Use of Confocal Microscopy to Analyze the Rate of Vancomycin Penetration through *Staphylococcus aureus* Biofilms," Antimicrobial Agents and Chemotherapy, 2005, vol. 49, No. 6, pp. 2467-2473 (Am. Soc. for Microbiology; Washington, D.C.).

F. Lavigne et al., "Selective Irrigation of the Sinuses in the Management of Chronic Rhinosinusitis Refractory to Medical Therapy: A Promising Start," J. Otolaryngology, 2004, vol. 33, No. 1, pp. 10-16 (B.C. Decker Inc.; Hamilton, Ontario, Canada).

J.E. Cho Lieu et al., "Methodologic Assessment of Studies on Endoscopic Sinus Surgery," Arch. Otolaryngol—Head and Neck Surg., 2003, vol. 129, pp. 1230-1235 (American Medical Assn.; Chicago, Illinois).

A. Luong et al., "Sinus Surgery: Indications and Techniques," Clin. Reviews in Allergy & Immunology, 2006, vol. 30, No. 3, pp. 217-222 (Humana Press Inc.; New York, NY).

E.O. Meltzer et al., "Rhinosinusitis: Establishing definitions for clinical research and patient care," J. Allergy Clin. Immunol., 2004, vol. 114, No. 6, pp. S155-S212 (Amer. Acad. of Allergy, Asthma, and Immunology; Milwaukee, Wisconsin).

D.P. Morris et al., "Biofilm: Why the Sudden Interest?", J. Otolaryngology, 2005, vol. 34, supp. 2, pp. S56-S59 (B.C. Decker Inc.; Hamilton, Ontario, Canada).

D.M. Nadel et al., "Endoscopically Guided Cultures in Chronic Sinusitis," Am. J. Rhinology, 1998, vol. 12, No. 4, pp. 233-241 (OceanSide Publications, Inc.; Providence, Rhode Island).

(56) References Cited

OTHER PUBLICATIONS

J.N. Palmer, "Bacterial Biofilms: Do They Play a Role in Chronic Sinusitis?", Otolaryngol Clin. N. Am., 2005, vol. 38, pp. 1193-1201, (Elsevier Inc.; Maryland Hts., Missouri).
J.R. Perloff et al., "Evidence of Bacterial Biofilms on Frontal Recess Stents in Patients with Chronic Rhinosinusitis," Am. J. of Rhinology, 2004, vol. 18, No. 6, pp. 377-380, (OceanSide Publications, Inc.; Providence, Rhode Island).
J.R. Perloff et al., "Evidence of Bacterial Biofilms in a Rabbit Model of Sinusitis," Am. J. Rhinology, 2005, vol. 19, No. 1, pp. 1-6 (OceanSide Publications, Inc.; Providence, Rhode Island).
J.C. Post, "Direct Evidence of Bacterial Biofilms in Otitis Media," Laryngoscope, 2001, vol. 111, pp. 2083-2094, (The Amer. Laryngological, Rhinological and Otological Society, Inc.; Omaha, Nebraska).
J.C. Post et al., "The role of biofilms in otolaryngologic infections," Current Opinion in Otolaryngology & Head and Neck Surgery, 2004, vol. 12, pp. 185-190 (Lippincott Williams & Wilkins; Baltimore, Maryland).
C. Potera, "Forging a Link Between Biofilms and Disease," Science, 1999, vol. 283, No. 5409, pp. 1837-1839 (Am. Assn. for the Advancement of Science; Washington, D.C.).
H.H. Ramadan et al., "Chronic rhinosinusitis and biofilms," Otolaryngol. Head and Neck Surgery, 2005, vol. 132, No. 3, pp. 414-417 (Amer. Acad. of Otolaryngology—Head and Neck Surgery Foundation, Inc.; Alexandria, Virginia).
M.G. Rayner et al., "Evidence of Bacterial Metabolic Activity in Culture-Negative Otitis Media with Effusion," JAMA, 1998, vol. 279, No. 4, pp. 296-299 (Amer. Med. Assn.; Chicago, Illinois).
J.M. Rosiak et al., "Radiation Formation of Hydrogels for Biomedical Purposes, Some Remarks and Comments," Radiat. Phys. Chem., 1995, vol. 46, No. 2, pp. 161-168 (Elsevier Science Ltd.; London, UK).
J.A. Sanclement et al., "Bacterial Biofilms in Surgical Specimens of Patients with Chronic Rhinosinusitis," Laryngoscope, 2005, vol. 115, pp. 578-582 (The American Laryngological, Rhinological and Otological Society, Inc.; Omaha, Nebraska).
A.R. Sanderson et al., "Bacterial Biofilms on the Sinus Mucosa of Human Subjects With Chronic Rhinosinusitis," Laryngoscope, 2006, vol. 116, pp. 1121-1126 (The American Laryngological, Rhinological and Otological Society, Inc.; Omaha, Nebraska).
T.L. Smith et al., "Evidence Supporting Endoscopic Sinus Surgery in the Management of Adult Chronic Rhinosinusits: A Systematic Review," Am. J. Rhinology, 2005, vol. 19, No. 6, pp. 537-543 (OceanSide Publications, Inc.; Providence, Rhode Island).
S. Stepanović et al., "A Modified microtiter-plate test for quantification of staphylococcal biofilm formation," J. Microbiological Methods, 2000, vol. 40, pp. 175-179 (Elsevier Science B.V.; Amsterdam, Netherlands).
E.L.G.M. Tonnaer et al., "Advances in Understanding the Pathogenesis of Pneumococcal Otitis Media," Pediatr. Infect. Dis. J., 2006, vol. 25, No. 6, pp. 546-552 (Lippincott Williams & Wilkins; Baltimore, Maryland).
M.C. Walters III et al., "Contributions of Antibiotic Penetration, Oxygen Limitation, and Low Metabolic Activity to Tolerance of *Pseudomonas aeruginosa* Biofilms to Ciprofloxacin and Tobramycin," Antimicrob. Agents Chemother., 2003, vol. 47, No. 1, pp. 317-323 (Amer. Soc. for Microbiology; Washington, D.C.).
I.J. Witterick et al., "Surgical management of chronic rhinosinusitis," Immunol. Allergy Clin. N. Am., 2004, vol. 24, pp. 119-134, (Elsevier Inc.; Maryland Heights, Missouri).
P. Wormald et al., "A Sheep Model for the Study of Biofilms in Rhinosinusitis," paper from 2006 Annual Meeting of the American Rhinologic Society, held in Toronto, Ontario, Canada (Sep. 2006).
E.D. Wright et al., "Infections Adult Rhinosinusitis: Etiology, Diagnosis, and Management Principles," J. Otolaryngology, 2005, vol. 34, pp. S7-S13 (Supplement 1).
Extended Search Report and Search Opinion in EP appl. No. 09819706.4.
International Search Report and Written Opinion of the ISR in counterpart int'l appl. No. PCT/US2012/037320.
Official action dated Nov. 23, 2011 in commonly assigned U.S. Appl. No. 12/573,340.
Official action dated Jul. 17, 2012 in commonly assigned U.S. Appl. No. 12/573,340.
J.C. Carman et al., "Treatment of Biofilm Infections on Implants with Low-frequency Ultrasound and Antibiotics," Am. J. Infect. Control, 2005, 33(2), pp. 78-82 (Elsevier Inc.; Philadelphia, Pennasylvania).
M. Simoes et al., "Action of a cationic surfactant on the activity and removal of bacterial biofilms formed under different flow regimes," Water Research, 39 (2005), pp. 478-486 (Elsevier Ltd.; London, UK).
First JPO examination report in JP appl. No. 2014-510466, dated Mar. 1, 2016.
Second JPO examination report in JP appl. No. 2014-510466, dated Jul. 4, 2016.
First EPO examination report in EP appl. No. 12781707.0, dated Oct. 31, 2016.

\* cited by examiner

ANTIMICROBIAL SOLID AND METHODS OF MAKING AND USING SAME

CROSS-REFERENCE TO RELATED APPLICATION

This application claims the benefit of U.S. provisional appl. No. 61/484,558 filed 10 May 2011, the entire disclosure of which is incorporated herein by reference.

BACKGROUND INFORMATION

Bacteria is found virtually everywhere and is responsible for a significant amount of disease and infection. Killing and/or eliminating these microorganisms is desirable to reduce exposure and risk of disease.

Bacteria in many environments are present in high concentrations and have developed self preservation mechanisms and, therefore, are extremely difficult to remove and/or eradicate. They can exist in planktonic, spore and biofilm forms.

In a biofilm, bacteria interact with surfaces and form surface colonies which adhere to a surface and continue to grow. The bacteria produce exopolysaccharide (EPS) and/or extracellularpolysaccharide (ECPS) macromolecules that keep them attached to the surface and form a protective barrier effective against many forms of attack. Protection most likely can be attributed to the small diameter of the flow channels in the matrix, which restricts the size of molecules that can transport to the underlying bacteria, and consumption of biocides through interactions with portions of the EPS/ECPS macromolecular matrix.

Bacteria often form spores, which provide additional resistance to eradication efforts. In this form, the bacteria create a hard, non-permeable protein/polysaccharide shell around themselves which prevents attack by materials that are harmful to the bacteria.

Additionally, bacteria in biofilm- or spore forms are down-regulated (sessile) and not actively dividing. This makes them resistant to attack by a large group of antibiotics and antimicrobials, which attack the bacteria during the active parts of their lifecycle, e.g., cell division.

Due to the protection afforded by a macromolecular matrix (biofilm) or shell (spore) and their down-regulated state, bacteria in biofilm- and spore states are very difficult to treat. The types of biocides and antimicrobials effective in treating bacteria in this form are strongly acidic, oxidizing, and toxic, often involving halogen atoms, oxygen atoms, or both. Common examples include concentrated bleach, phenolics, strong mineral acids (e.g., HCl), hydrogen peroxide and the like. Commonly, large dosages of such chemicals are allowed to contact the biofilm or spore for extended amounts of time (up to 24 hours in some circumstances), which makes them impractical for many applications.

Recently developed formulations intended for use in connection with compromised animal/human tissue can solvate a biofilm matrix so that still-living bacteria can be rinsed or otherwise removed from infected tissue; the concentrations of active ingredients in these formulations are too low to effectively kill the bacteria, thus making them ill suited for use as disinfecting agents. More recently, solutions that can disrupt the macromolecular matrix, or bypass and/or disable the defenses inherent in these matrices, allowing lethal doses of antimicrobial ingredients in the solutions to access and kill the bacteria in their biofilm and sessile states have been described; unlike the aforementioned formulations, these solutions can be used as disinfectants.

Most water filtration is accomplished using filters made of materials such as paper, fiber, and synthetic fibers. Unclean, bacteria-laden water is passed through a membrane having a controlled pore size, typically on the order of ~0.20 to ~0.45 μm. These membranes are effective at keeping bacteria from passing through them into a clean water reservoir, but they do not weaken, disable or kill the bacteria. This latter characteristics make such membranes susceptible to bacterial growth, thereby increasing the risks of contamination with biofilms and spore-forming bacteria and reduced flow rates due to clogging.

Silver-loaded ceramic filters use the antimicrobial properties of silver to kill bacteria as they pass through a porous ceramic substrate. To achieve high efficacy, flow rates must be kept low. Further, these filters have a high propensity for clogging. Finally, silver ions are not particularly efficacious in debilitating and killing bacteria in biofilm- and spore forms.

Devices and articles can be provided with coatings that include antimicrobials such as cationic compounds (e.g., quaternary ammonia compounds), silver and copper compounds, and peptides. These coatings are limited in their efficacy against resistant forms of bacteria and have very thin regions of effective antimicrobial effect. These types of coatings are generally designed to prevent surface attachment of bacteria rather than to disinfect.

Certain eluting devices and articles are designed to slowly release anti-bacterial compounds when exposed to moisture. These solids typically been impregnated by antimicrobial agents which, over time, work their way to the surface and are released. The concentrations of solutions eluted from these devices and articles, as well as the efficacy of the employed antimicrobial agents against resistant forms of microbes, are low. The utility of such devices and articles is further reduced in situations where a liquid is to pass through the device due to more rapid depletion of the antimicrobial agent(s).

A solid material capable of preventing bacterial growth, and preferably killing bacteria coming into contact with or close proximity to the solid material, remains desirable. Such a solid preferably can be useful in a variety of forms including, but not limited to, filters, eluting devices, and coatings.

SUMMARY

Liquid compositions effective for disinfection purposes are described in U.S. Pat. Publ. No. 2010/0086576 A1. Those compositions display both moderately high tonicity (i.e., large amounts of osmotically active solutes) and relatively low pH (about 4≤pH≤6) which work with surfactants to induce membrane leakage in bacteria, leading to cell lysis. The composition acts at least in part to interrupt or break ionic crosslinks in the macromolecular matrix of a biofilm, facilitating the passage of solutes and surfactant through the matrix to bacteria entrained therein and/or protected thereby. In addition to being lethal toward a wide spectrum of gram positive and gram negative bacteria, these liquid compositions also exhibit lethality toward other microbes such as viruses, fungi, molds, and yeasts.

However, some end-use applications are not conducive to the relatively high concentrations that provide the liquid compositions with their efficacy. These include, but are not limited to, applications where a high concentration of free (unbound) species of these ingredients is unacceptable, applications where an extremely large volume of liquid needs to be disinfected, and applications where such ingredients will be consumed.

The solid materials of the present invention are designed and intended to achieve, in a non-liquid form, a set characteristics similar to those displayed by the aforementioned liquid compositions: high tonicity and surfactant availability.

These solid materials, adapted to kill bacteria in planktonic, spore and biofilm states, include a crosslinked version of a water soluble polyelectrolyte and entrained surfactant. This combination of components permits the local chemistry within the solid material and in its immediate vicinity, when in use in an aqueous environment, to mimic that of the previously described liquid disinfecting composition: high tonicity and high surfactant concentration. In at least some embodiments, the solid material includes no biocidal additives, particularly active antimicrobial agents.

In certain aspects, the solid material can be prepared by crosslinking a liquid or flowable polyelectrolyte in the presence of the surfactant(s).

Also provided are methods of using the foregoing composition. When a liquid is passed through or in proximity to the solid material, any bacteria or other microorganism is exposed to the local chemistry conditions discussed above: high tonicity, relatively low pH, and available surfactant, a combination that can induce membrane leakage in bacteria leading to cell lysis. These characteristics permit the solid material to be very effective at bypassing and disabling bacterial biofilm and spore defenses, allowing the solid material to kill bacteria in any of its several states.

The solid material can be used to disinfect liquids, in either filter or insert form, and as surface coating that prevents bacterial contamination by killing any bacteria that come into contact therewith. That it can perform these tasks while losing or transmitting very little of its chemical components into the environment being treated is both surprising and advantageous. Further, any chemical components that do enter the environment are relatively benign.

To assist in understanding the following description of various embodiments, certain definitions are provided immediately below. These are intended to apply throughout unless the surrounding text explicitly indicates a contrary intention:

"microbe" means any type of microorganism including, but not limited to, bacteria, viruses, fungi, viroids, prions, and the like;

"antimicrobial agent" means a substance having the ability to cause greater than a 90% (1 log) reduction in the number of one or more of microbes;

"active antimicrobial agent" means an antimicrobial agent that is effective only or primarily during the active parts of the lifecycle, e.g., cell division, of a microbe;

"biofilm" means a community of microbes, particularly bacteria and fungi, attached to a surface with the community members being contained in and/or protected by a self-generated macromolecular matrix;

"residence time" means the amount of time that an antimicrobial agent is allowed to contact a bacterial biofilm;

"biocompatible" means presenting no significant, long-term deleterious effects on or in a mammalian species;

"biodegradation" means transformation, via enzymatic, chemical or physical in vivo processes, of a chemical into smaller chemical species;

"polyelectrolyte" means a polymer with multiple mer that include an electrolyte group capable of dissociation in water;

"strong polyelectrolyte" is a polyelectrolyte whose electrolyte groups completely dissociate in water at $3 \leq pH \leq 9$;

"weak polyelectrolyte" is a polyelectrolyte having a dissociation constant of from ~2 to ~10, i.e., partially dissociated at a pH in the range where a strong polyelectrolyte's groups are completely dissociated; and "polyampholyte" is a polyelectrolyte with some mer including cationic electrolyte groups and other mer including anionic electrolyte groups.

Hereinthroughout, pH values are those which can be obtained from any of a variety of potentiometric techniques employing a properly calibrated electrode.

The relevant portions of any specifically referenced patent and/or published patent application are incorporated herein by reference.

DETAILED DESCRIPTION

The antimicrobial solid material can contain as few as two components: a crosslinked polymer network and at least one entrained surfactant, each of which generally is considered to be biocompatible. Certain embodiments of the composition employ no active biocides. In these and other embodiments, the identity of the polymers and surfactants, as well as the concentrations in which each is discharged from the solid material, can be such that recognized toxicity limits are not exceeded during normal use.

The solid material is lethal to planktonic and bacterial cells with high efficacy, is not readily consumed, provides a significant amount of surface area for microbial interactions, and does not create toxicity in solutions being treated. The solid material is not particularly soluble in water under most conditions (e.g., moderate temperatures and solute concentrations), but the polyelectrolyte chains are at least hydrophilic and, where the solid material is to be used in a setting where it might not be immersed in an aqueous medium, preferably hygroscopic, thereby permitting the solid material to swell somewhat when in the presence of moisture, particularly water.

The lethality of the surfactant component(s) is increased and/or enhanced when the solid material can provide to the local environment in which it is deployed at least moderate effective solute concentrations (tonicity). (In biological applications, a 0.9% (by wt.) saline solution, which is ~0.3 Osm, typically is considered to be have moderate tonicity, while a 3% (by wt.) saline solution, which is ~0.9 Osm, generally is considered to be hypertonic.) Without wishing to be bound by theory, higher tonicities may exert higher osmotic pressure to the bacterial cell wall, which increases its susceptibility to interruption by surfactant. Local osmolarity (tonicity) generally increases in proportion to the number and type of electrolytes present in the polymeric network. (By local osmolarity is meant that of a liquid contained in the solid material. While this might vary from place to place throughout the article, preference is given to those solid materials capable of providing high local osmolarities throughout.)

Because the antimicrobial material is solid, it does not itself have a true pH; in use, however, the local pH of any aqueous composition in which it is deployed preferably is lower than ~7 to ensure proper antimicrobial activity. Reduced pH values (e.g., less than ~6.5, ~6.0, ~5.5, ~5.0, ~4.5 and even ~4.0) generally are believed to correlate with increases in efficacy of the solid material, although this effect might not be linear, i.e., the enhancement in efficacy may be asymptotic past a certain hydronium ion concentration. Without wishing to be bound by theory, acidic protons (i.e., hydronium ions) might be involved in breaking ionic crosslinks in the macromolecular matrix of a biofilm.

In addition to more strongly acidic local environments, high local osmolarity conditions also are believed to increase efficacy. Accordingly, larger concentrations of polyelectrolytes, larger concentrations of surfactant, surfactants with shorter chain lengths (e.g., no more than $C_{10}$, typically no more than $C_8$, commonly no more than $C_6$), and surfactants with smaller side groups around the polar group each are more desirable.

The solid material of the present invention requires some level of water or humidity to function appropriately. This can be determined or defined in a variety of ways. The polyelectrolytes must be capable of localized liquid charge interaction (meaning at least two water molecules are contacting or very near an electrolyte group); alternatively, sufficient water must be present to activate the charge of the electrolyte; and/or sufficient water to permit bacterial growth. As non-limiting examples, gaseous or liquid water can be applied directly to the solid material or can result from other, indirect means, e.g., water vapor contained in breath or ambient air, condensates, etc.

The polyelectrolyte(s) that form the bulk of the solid material preferably are at least somewhat water soluble but also essentially water insoluble after being cross-linked. A partial list of polyelectrolytes having this combination of characteristics included, but are not limited to, strong polyelectrolytes such as polysodium styrene sulfonate and weak polyelectrolytes such as polyacrylic acid, pectin, carrageenan, any of a variety of alginates, polyvinylpyrrolidone, carboxymethylchitosan, and carboxymethylcellulose. Included in potentially useful polyamphyolytes are amino acids and betaine-type cross-linked networks; examples would be hydrogels based on sodium acrylate and trimethylmethacryloyloxyethylammonium iodide, 2-hydroxyethylmethacrylate, or 1-vinyl-3(3-sulfopropyl)imidazolium betaine. Those polymeric materials having electrolyte groups that completely (or nearly completely) dissociate in water and/or provide relatively low local pH values are desired for efficacy are preferred.

Also preferred are those polyelectrolytes having a high density of mer with electrolyte-containing side groups. Without wishing to be bound by theory, the large number of acidic or polar side groups on the polyelectrolyte are believed to function equivalently to the high tonicity solution of the previously described liquid composition.

Several crosslinking mechanisms including but not limited to chemical, high temperature self-crosslinking (i.e., dehydrothermal crosslinking), and irradiation (e.g., e-beam or gamma rays) can be employed. The ordinarily skilled artisan can discern and select an appropriate crosslinking mechanism once a polyelectrolyte is selected.

Another option is to create crosslinks during the polymerization process itself, such as by condensing adjacent sulfonic acid groups to yield sulfonyl crosslinks.

Independent of crosslinking method, the solid material can be formed by crosslinking polymers (or polymerizable monomers) in an aqueous solution contained in a heat conductive mold, followed by rapid freezing and subsequent lyophilizing. The resulting sponge-like material generally takes the shape of the mold in which it was formed. A potential advantage of this process is that it can provide a ready means for removing any hazardous or undesirable precursor chemicals used in the polymerization and/or crosslinking steps. Solids resulting from this type of process often have a spongy appearance, with relatively large pores connected by tortuous paths. Often, pores less than ~0.22 µm, less than ~0.45 µm, less than ~0.80 µm, and less than ~0.85 µm are desirable (based on the diameters of endotoxins, bacteria, and spores); for these and other applications, a solid material with at least some larger pores (e.g., less than ~1, 2, 5, 10, 50, or 100 µm) can be used.

The crosslink density in the solid material plays an important role, specifically, those solid materials with higher crosslink densities tend to maintain higher surfactant concentrations for a longer period of time due to, presumably, longer mean free paths in the polymeric network.

The solid material contains a sufficient amount of surfactant to interrupt or rupture cell walls of bacteria contacting or coming into the vicinity of the solid material. This amount can vary widely based on a variety of factors including, for example, whether a biofilm already exists in the area to be treated (and whether that biofilm is entrenched, a factor which relates to the type of proteins and mass of the macromolecular matrix), the species of bacteria, whether more than one type of bacteria is present, the solubility of the surfactant(s) in the local environment, and the like. The surfactant component(s) generally constitute as low as ~0.03% and as high as ~10%, ~15% or even ~17.5% (all by wt.) of the solid material.

Essentially any material having surface active properties in water can be employed, although those that bear some type of ionic charge are expected to have enhanced antimicrobial efficacy because such charges, when brought into contact with a bacteria, are believed to lead to more effective cell membrane disruption and, ultimately, to cell leakage and lysis. This type of antimicrobial process can kill even sessile bacteria because it does not involve or entail disruption of a cellular process. Cationic surfactants are most desirable followed by, in order, zwitterionic, anionic and non-ionic.

Potentially useful anionic surfactants include, but are not limited to, sodium chenodeoxycholate, N-lauroylsarcosine sodium salt, lithium dodecyl sulfate, 1-octane-sulfonic acid sodium salt, sodium cholate hydrate, sodium deoxycholate, sodium dodecyl sulfate, sodium glycodeoxycholate, sodium lauryl sulfate, and the alkyl phosphates set forth in U.S. Pat. No. 6,610,314. Potentially useful cationic surfactants include, but are not limited to, hexadecylpyridinium chloride monohydrate and hexadecyltrimethylammonium bromide, with the latter being a preferred material. Potentially useful nonionic surfactants include, but are not limited to, polyoxyethyleneglycol dodecyl ether, N-decanoyl-N-methylglucamine, digitonin, n-dodecyl B-D-maltoside, octyl B-D-glucopyranoside, octylphenol ethoxylate, polyoxyethylene (8) isooctyl phenyl ether, polyoxyethylene sorbitan monolaurate, and polyoxyethylene (20) sorbitan monooleate. Potentially useful zwitterionic surfactants include, but are not limited to, 3-[(3-cholamidopropyl) dimethylammonio]-2-hydroxy-1-propane sulfonate, 3-[(3-cholamidopropyl) dimethylammonio]-1-propane sulfonate, 3-(decyldimethylammonio) propanesulfonate inner salt, and N-dodecyl-N,N-dimethyl-3-ammonio-1-propanesulfonate. For other potentially useful materials, the interested reader is directed to any of a variety of other sources including, for example, U.S. Pat. Nos. 4,107,328 and 6,953,772 as well as U.S. Pat. Publ. No. 2007/0264310.

The surfactant preferably is present in the polymer network at the time that crosslinking occurs (or the time of polymerization in the case of the type of simultaneous polymerization and condensation discussed above). If it is not, a crosslinked polymer article or film must be post-treated to ensure proper entrainment of the surfactant. A possible method for accomplishing this is immersion of the article or film in an aqueous solution that contains one or more surfactants, followed by removal of excess water via a drying (e.g., thermal or freeze) or evacuation process.

In certain embodiments, the surfactant(s) can be the only antimicrobial agents in the composition, specifically, the composition can be free of active antimicrobial agents.

In addition to the surfactant(s), one or more ionic compounds (salts) can be incorporated into the solid material so as to enhance its ability to create localized regions of high tonicity.

Regardless of how achieved, the local tonicity around the solid material is at least moderately high, with an osmolarity of at least about 0.1 Osm being preferred for most applications. Solid materials that create local osmolarities greater than about 0.1 Osm will have enhanced bactericidal activity; increases in the osmotic pressure applied to the bacteria enhance antimicrobial efficacy.

A variety of additives and adjuvants can be included to make a solid material more amenable for use in a particular end-use application without negatively affecting its efficacy in a substantial manner. Examples include, but are not limited to, emollients, fungicides, fragrances, pigments, dyes, abrasives, bleaching agents, preservatives (e.g., antioxidants) and the like. Depending on the identity and nature of a particular additive, it can be introduced at any of a variety of times during production of the solid material.

The solid material does not require inclusion of an active antimicrobial agent for efficacy, but such materials can be included in certain embodiments. For example, one or more of bleach, any of a variety of phenols, aldehydes, quaternary ammonium compounds, etc., can be added.

As previously stated, bacteria present in a biofilm derive some inherent protection offered by the EPS/ECPS macromolecular matrix. Without wishing to be bound by theory, the high tonicity and slightly acidic nature of the solid material (as well as the region immediately surrounding it when it is in use) are believed to interfere with and break the ionic crosslinks in the macromolecular matrix of any biofilm passing near or through the material, thus permitting better access to the previously protected bacteria. Additionally, the high tonicity provided in and around the solid material means that an abundance of ions are available, even though some are consumed in the EPS. These ions can assist in killing the bacteria while they remain in the biofilm and after they are freed therefrom, perhaps by making the bacterial cell walls susceptible to being ruptured by the surfactant component(s).

Thus, the solid material that includes one or more surfactants entrained in a polymer network possesses a combination of characteristics and attributes that allow it to be a highly effective yet non-toxic antimicrobial:

1) a capability to provide an aqueous liquid contacting it a local pH (in and/or very near it) of less than 7, preferably less than 6;
2) the polymeric network is hydrophilic (and, where the solid material is intended for use at least some of the time in a non-immersed state, perhaps even hygroscopic);
3) a capability to provide an aqueous liquid contacting it an effective local solution osmolarity (in and/or very near the solid material) of at least ~0.1 Osm;
4) a sufficient concentration of one or more surfactants to rupture cell walls of bacteria contacting or coming near to the solid material; and
5) a crosslink density of the polymeric network is great enough to greatly slow the rate of surfactant loss from the material.

This solid material is actively antimicrobial, has greater antimicrobial efficacy against bacteria in resistant forms, is not rapidly consumed, and does not create toxicity in the medium being treated.

The solid material can take any of a variety of intermediate and final shapes or forms including, but are not limited to, a spongy solid that is permeable to vapor and or liquids; a molded, extruded or deposited sheet; and an extruded fiber or thread. Once in a particular shape, the material then can be further processed or manipulated so as to provide a desired shape, e.g., a sheet good can be rolled or folded so as to provide a membrane of a particular geometry. Thus whether the material is used in its manufactured form or it is post processed by thermal forming, mechanical shaping, lamination, granulation, pulverization, etc., it is considered to be within the present disclosure.

A single, non-limiting example of a potential use for a solid antimicrobial material is as a filter (or part of a filtration device) to be placed in the flow path of a vapor or liquid passing there-through, -over or -by. Such a material can be housed, sealed, or adhered in a variety of ways so as to permit fluid flow to be directed through, around, or over it.

A filter can be provided by making a spongy solid (via, for example, a lyophilization process such as the one described above) with a surfactant trapped therein. Water can be passed through or past the spongy solid, which will work as a filter device, which is actively antimicrobial and kills any bacteria passing through the element.

Such a filter can have high flow rates because of its active antimicrobial nature and, therefore, can have larger pore sizes than current sterile filters which rely on extremely small pores to prevent passage of bacteria through the filter. Larger pores also mean that such a filter will be less susceptible to clogging, thus increasing its viable lifecycle. Thus, the resulting filtration device has high bactericidal activity toward planktonic and bacterial cells, permits high fluid flow rates, is less susceptible to clogging, and produces disinfected water which is non-toxic when ingested.

As an alternative to a spongy, amorphous mass, a much more structured form, e.g., a fabric (woven or nonwoven) made from or incorporating threads provided from a solid antimicrobial material of the present invention, also can be employed for such filtration applications.

In addition to water filtration, other potential uses for solid materials of the present invention include, but are not limited to, air filters, odor controlling articles (e.g., clothing such as socks, shoe inserts, etc.), pool water treatment articles, disinfecting wipes, mine waste pool barriers (to prevent acidic leakage due to bacterial activity), bandages, humidifier wicking elements, layers in personal protection articles such as diapers and feminine hygiene products, and the like.

The solid material of the present invention also can be used as an antimicrobial surface coating or external surface layer for the prevention of bacterial contamination of the protected surface. In this manner, the material will kill bacteria, in any form, coming into contact with the surface of the material. Potential end use applications for such coatings include, but are not limited to, cooler surfaces, refrigerator interiors, drip pans (e.g., refrigerators, dehumidifiers, etc.), food storage containers, tracheotomy tubes, external surfaces of temporarily or permanently implanted medical devices, contact surfaces in medical equipment (e.g., fluid lines, fittings, joints, reservoirs, covers, etc.), reagent bottles, telephone and remote control surfaces (e.g., buttons), medical devices intended to contact more than one patient (e.g., blood pressure cuffs, stethoscopes, wheelchairs, gurneys, etc.), plumbing fixtures, pipes and traps, recreational vehicle cisterns and tanks, shower walls and components, canteens, beverage dispensers and transfer lines, baby feeding equipment (e.g., bottles, nipples, etc.), pacifiers, teething rings, toys, playground and exercise equipment, outdoor equipment (e.g., tents, boat covers, sleeping bags, etc.), and the like.

As is clear from the foregoing description, the solid material may take many different physical forms and find use in a variety of devices. Its components can be provided from a wide variety of materials, and its polymer network can be crosslinked in a variety of ways. Thus, the ordinarily skilled artisan understands that the functionality of the components and not their specific identity or manner of processing is that which is most important; the ever evolving fields of chemistry and polymer science are anticipated to provide additional options not known at the time of this writing that provide similar functionality. (By way of non-limiting example, surfactants are described here as a key component for providing bactericidal activity; however, newly developed compounds that do not fit entirely within the definition of "surfactant" yet still possess the types of charged or polar side groups that provide the same functional mechanism are quite reasonably expected to be useful in solid material.)

While various embodiments of the present invention have been provided, they are presented by way of example and not limitation. The following claims and their equivalents define the breadth and scope of the inventive methods and compositions, and the same are not to be limited by or to any of the foregoing exemplary embodiments.

That which is claimed is:

1. An antimicrobial solid comprising a hydrophilic crosslinked polymer network that is an amorphous, spongy solid which comprises some pores having diameters of at least 10 µm and some pores having diameters of less than about 0.85 µm and one or more ionic surfactants entrained in said spongy solid network.

2. The antimicrobial solid of claim 1 wherein said polymer network comprises one or more polyelectrolytes.

3. The antimicrobial solid of claim 1 wherein said polymer network consists essentially of polyelectrolytes.

4. An article comprising the antimicrobial solid of claim 1.

5. The antimicrobial solid of claim 2 wherein said one or more polyelectrolytes are hygroscopic.

6. The antimicrobial solid of claim 2 wherein said one or more polyelectrolytes comprise a strong polyelectrolyte.

7. The antimicrobial solid of claim 6 wherein said strong polyelectrolyte is polysodium styrene sulfonate.

8. The antimicrobial solid of claim 2 wherein said one or more polyelectrolytes comprise a weak polyelectrolyte.

9. The antimicrobial solid of claim 8 wherein said weak polyelectrolyte is selected from polyacrylic acid, pectin, carrageenan, an alginate, polyvinylpyrrolidone, carboxymethylchitosan, and carboxymethylcellulose.

10. The antimicrobial solid of claim 1 wherein said polymer network comprises one or more polyampholytes.

11. The antimicrobial solid of claim 10 wherein said one or more polyampholytes comprises a hydrogel prepared from materials that comprise sodium acrylate and trimethylmethacryloyloxyethylammonium iodide, 2-hydroxyethyl-meth-acrylate, or 1-vinyl-3(3-sulfopropyl)imidazolium betaine.

12. The antimicrobial solid of claim 1 wherein said one or more entrained surfactants are present in an amount of up to 10 weight percent based on the weight of said solid.

13. The antimicrobial solid of claim 1 wherein said solid is free of active antimicrobial agents.

14. The antimicrobial solid of claim 1 wherein said pores are connected by tortuous paths.

15. The antimicrobial solid of claim 14 wherein said solid is adapted for use as a filter.

\* \* \* \* \*